April 18, 1961 E. A. PRIJATEL ET AL 2,980,132
SAFETY RELIEF VALVE
Filed Nov. 25, 1957
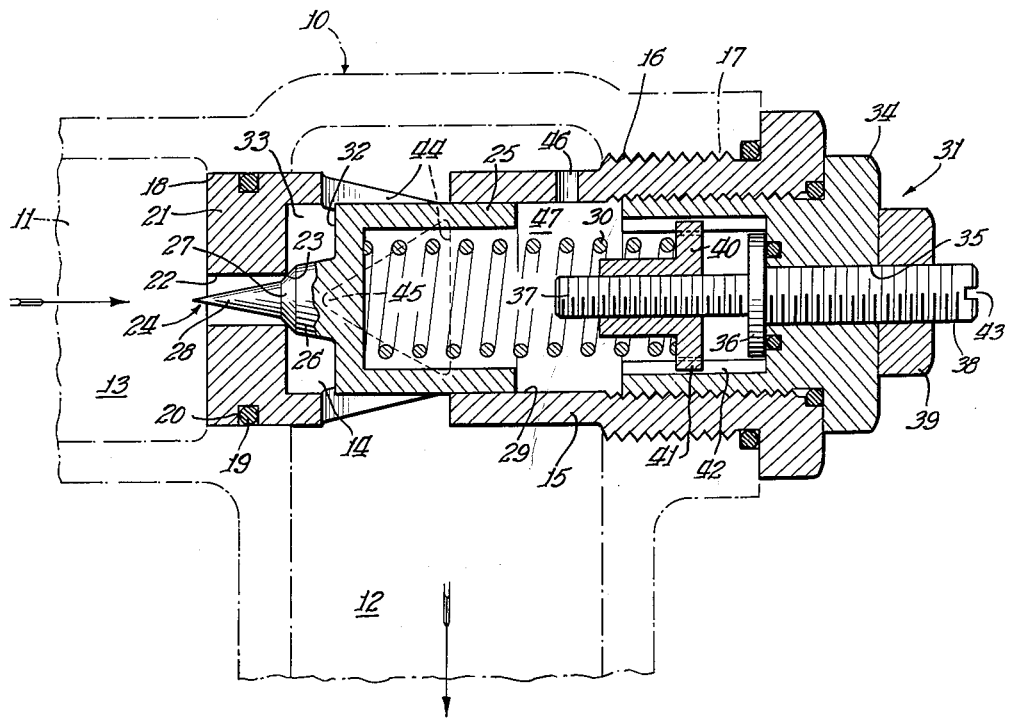
Inventors:
Edward A. Prijatel and
Henry H. Campbell
By: Frank C. Parker
Atty.

United States Patent Office 2,980,132
Patented Apr. 18, 1961

2,980,132

SAFETY RELIEF VALVE

Edward A. Prijatel, Lyndhurst, and Henry H. Campbell, East Cleveland, Ohio, assignors to Borg-Warner Corporation, Chicago, Ill., a corporation of Illinois Filed Nov. 25, 1957, Ser. No. 698,719

1 Claim. (Cl. 137—469)

This invention relates to a relief valve for a hydraulic system and more particularly to an improved relief valve of the type wherein the system pressure is utilized to open the relief valve when the system pressure is above a predetermined pressure of the pressure setitng of the relief valve.

Heretofore, relief valves utilized in hydraulic pressure systems, generally, have comprised a valve body biased against a valve seat located in a port interconnecting the system pressure with a return line or vent. Such relief valve assemblies have a tendency to chatter due to the relatively short valve stroke thereof, i.e., the distance the valve body moves relative to the valve seat, and due to hunting of the relief valve which sets up a rhythmic motion of the valve body and its biasing means which results in noise or chatter and wear of the moving parts of the assembly. Further, in valves of this type the biasing means, usually a helical spring, acting in opposition to the system pressure acting on the forward end of the valve body is set with a predetermined urging force whereby the valve body will remain in engagement with its valve seat until the system pressure exceeds the predetermined force of the biasing means. For example, if the biasing means is set so that the relief valve will not crack or open until the system pressure exceeded 1,000 p.s.i., then until the system pressure acting on the forward end of the valve body exceeds this value, the valve body will remain closed. However, after the cracking or opening of the relief valve, the rapid flow of fluid therearound causes a reduction in the system pressure in the regions adjacent the forward end of the valve body. This causes the valve body to close prematurely of the complete reduction of the system pressure required for the safety relief valve assembly. This causes repeated opening and closing of the relief valve which not only gives a pressure rise characteristic to the system pressure but also causes excessive chattering.

It is therefore an object of this invention to provide an improved relief valve of the above-described type in which chattering and noise are eliminated in part.

It is another object of this invention to provide an improved relief valve assembly in which the relief valve has a relatively long stroke.

A further object of this invention is to provide a relief valve assembly in which the relief valve, after the initial opening or cracking thereof, is substantially uneffected by the reduction in system pressure adjacent the forward end of the relief valve during the flow of fluid therearound.

Another object of this invention is to provide a relief valve assembly for a hydraulic pressure system in which a relief valve is biased in opposition to the pressure of the hydraulic system whereby the pressure of the hydraulic system acting upon a first motive surface of said relief valve causes initial opening and movement thereof and whereby a second motive surface carried by said relief valve is subject to the application of system pressure upon the initial movement of the relief valve to cause further movement of said relief valve relative to its valve seat.

Other and more particular objects, advantages, and uses of this invention will become apparent upon a reading of the following detailed description and the accompanying drawing wherein the drawing discloses an axial cross section of the relief valve incorporating the features of this invention.

Reference is now made to the drawing illustrating a safety relief valve incorporating one embodiment of this invention wherein is disclosed a housing 10, having an inlet 11 and an outlet 12 interconnected by a chamber formed in the housing 10. The left portion of the chamber is designated by the numeral 13 and the right portion of the chamber by the numeral 14. The inlet 11 is adapted to be connected within a hydraulic pressure system by any suitable means whereby the fluid pressure of the system is conveyed to the inlet 11. Outlet 12 may be connected to a return line, sump, or vent in any suitable manner.

The safety relief valve assembly comprises a hollow cylindrical valve body 15 disposed within the housing 10 and retained therein by the engagement of the threaded portion 16 of the valve body 15 with a threaded aperture 17 formed in the housing 10. A throat or aperture 18 is formed in the housing 10, whereby the aperture 18 interconnects the chambers 13 and 14 and sealably receives the left end of the valve body 15. An O-ring seal 19 disposed in an annular groove 20 formed in the outer periphery of the left end of the valve body 15 is utilized as the sealing means. An end portion 21 formed integrally with the valve body 15 at the left end thereof is provided with a central bore 22 which interconnects chambers 13 and 14. The right side of the end of the bore 22 forms a valve seat 23 for a relief valve now to be described.

The relief valve, generally indicated by reference numeral 24, comprises a piston-like portion 25 at one end thereof, an intermediate smaller truncated cone portion 26 having a tapered or beveled truncated cone edge 27, and a cone shaped left end portion or motive surface 28 which is smaller in cross section than either of the other portions. The relief valve 24 is telescoped within the valve body 15 which has a cylinder-like portion 29 in which the relief valve portion 25 is axially movable therein like a piston. The tapered edge 27 of the intermediate portion 26 of the relief valve 24 is utilized to engage the valve seat 23 to prevent communication between chambers 13 and 14. The cone-shaped portion 28 of the relief valve 24 projects through the bore 22 of the valve body 15 into the chamber 13. A helical spring 30 disposed within the valve body 15 has one end thereof engaging the piston portion 25 of the relief valve 24 and the other end thereof engaging an adjustable screw arrangement, indicated generally by the reference numeral 31, which will be later described. The spring 30 urges the relief valve 24 to the left to maintain engagement thereof with the valve seat 23.

A motive surface 32 is formed on the piston portion 25 of the relief valve 24. The various portions of the relief valve form a chamber 33 within the valve body 15 defined by the relief valve 24, the cylinder-like portion 29 of the valve body 15, and end portion 21 of the valve body 15.

The adjustable screw arrangement 31 comprises a cap member 34 threaded into the cylinder-like portion 29 of the valve body 15, the cap member 34 having an aperture 35 formed therein. A disk-like member 36 having coaxial studs 37 and 38 fixed centrally on each side thereof is disposed within the valve body 15 with the stud 38 projecting through the bore 35 of the cap member 34. The disk member 36 is maintained in sealed relationship with the internal portion of the cap member 34 by the retaining nut 39 threaded on the end of the stud 38. Stud 37 carries a cradle-like member 40 telescoped and threaded thereon which has outwardly extending flange portions 41 which are received in respective slots 42 formed in the internal periphery surface of the cap member 34. The other end of the spring 30 remote from the relief valve 34 engages the cradle-like member 40. By rotating stud 38, by means of a suitable tool projecting into a bifurcated slot 43 at the end thereof, the cradle-like member 40 will be moved axially on the stud 37 increasing or decreasing the effective length of the compression spring 30. In this manner the relief valve 24 can be set to open at a predetermined pressure as the relief valve 24 is exposed to system pressure.

Triangular-shaped apertures 44 are provided in the valve body 15 which interconnect the chamber 33 with the outlet 12. The pointed or tapered end 45 of the apertures 44 are located closer to the valve seat 23 than the larger portions of the apertures 44. Apertures 44 are also so disposed that when the relief valve 24 is engaging its valve seat 23, the piston portion 25 of the relief valve covers the majority of the area of the apertures 44 leaving a relatively small effective area thereof exposing chamber 33 to the outlet 12.

A vent port 46 is provided in the valve body 15 which interconnects the chamber 47 located to the right of the piston portion 25 within the valve body 15 to the outlet 12.

The operation of the above-described safety relief valve is as follows: System pressure present in chamber 13 by means of inlet 11 connected to the fluid pressure of a hydraulic pressure system by any suitable means acts upon the first motive surface or portion 28 of the relief valve 24 in opposition to the force thereon of the spring 30. When the pressure in chamber 13 exceeds the force of spring 30, the fluid pressure acting on the motive surface 28 causes the relief valve 24 to move to the right permitting the fluid pressure in chamber 13 to enter chamber 33. The bore 22 in the valve body 15 is relatively small producing a relatively small envelope of fluid passing therethrough. As the motive surface 32 is substantially larger than the motive surface 28 once fluid pressure is present in chamber 33 and acts on motive surface 32, the pressure force on surface 32 takes over control of the relief valve 24 from the pressure force acting on motive surface 28, even though the pressure in chamber 33 is an intermediate pressure. The fluid pressure in chamber 33 in turn acts on the second motive surface 32 of the relief valve 24 causing the piston portion 25 to move further to the right against the opposition force imparted thereto by spring 30 which in turn further uncovers the apertures 44 venting the system pressure to the outlet 12. Any fluid that has seeped into and has been trapped within the chamber 47 is vented by port 46 to the outlet 12 thereby eliminating any dash pot effect of chamber 47 retarding the movement of piston portion 25.

As can be seen, the motive surface or valve portion 28 of the relief valve 24 is only subject to system pressure acting in opposition to the force of spring 30 prior to the cracking or opening of relief valve 24 whereby the flow of fluid passing from chamber 13 into chamber 33, causing a reduction of pressure in the regions adjacent the motive surface 28, although dropping in value relative to the actual pressure in chamber 13, has no effect on maintaining valve 24 in the opened position or further movement thereof in opposition to the force of spring 30. Chamber 33 is now filled with fluid pressure from chamber 13 which fluid pressure acts upon the motive surface 32 of the piston portion 25 of the relief valve 24 and is utilized to overcome the opposition force of the spring 30 and moves the piston portion 25 to the right uncovering apertures 44 whereby the pressure in the hydraulic pressure system is reduced to the predetermined pressure value as predetermined by the setting of the compression force of spring 30. The initial movement of the piston portion 25 to the right uncovers the tapered portion of the apertures 44 in such a manner as to effect a relatively long valve stroke or movement of the relief valve 24 away from the valve seat 23 thus eliminating chatter or noise. In other words, each equal increment of movement of the piston portion 25 of the relief valve 24 away from the valve seat 23 increases the effective width of the apertures 44 due to the tapering configuration thereof. It should be understood, however, that apertures 44 do not necessarily have to have a triangular configuration but a configuration whereby the effective width thereof increases for a portion of the travel of the relief valve 24 to the right, which is deemed important and essential. Since during the initial movements of the piston portion 25 to the right, the effective area of the apertures 44 exposing system pressure to the outlet 12 is relatively small, the system pressure is not sufficiently reduced causing the pressure in chamber 33 to cause further movement of the piston portion 25 to the right until the apertures 44 are sufficiently uncovered whereby the effective area thereof exposing system pressure to the outlet 12 causes a reduction in system pressure to the desired level. This results in a relatively long valve stroke or movement of the relief valve 24 away from its valve seat 23.

When the pressure within the hydraulic pressure has been reduced to the predetermined pressure, spring 30 will cause the relief valve 24 to return the relief valve 24 to the left to engage the valve seat 23. The pressure within chamber 33 will be exposed to outlet 12 by the uncovered portions 45 of apertures 44 eliminating any dash pot effect of chamber 33 attempting to retard movement of the piston portion 25 to the left.

As above described, it can be seen that this invention provides a safety relief valve assembly in which a relatively long stroke of the relief valve is effected whereby noise and chatter is substantially eliminated by a more constant control over the relief valve movement and a safety relief valve assembly which has accurate control in reducing the system pressure when the system pressure exceeds a predetermined value without excessive hunting of the relief valve.

Where herein the various parts of this invention have been referred to as being located in a right or a left position, it will be understood that this is done solely for the purpose of facilitating description, and such references relate only to the relative positions of the parts as shown in the accompanying drawing.

While but one embodiment of this invention has been shown and described, it will be understood that many changes and modifications may be made therein without departing from the spirit or scope of the invention.

What is claimed is:

A safety relief valve assembly for a hydraulic system having pressure inlet means, comprising: means defining an inlet and outlet and a chamber interconnecting said inlet and outlet; a hollow valve body disposed in said chamber and having a cylindrical interior with an end wall sealingly separating said inlet from said outlet, said end wall having a central circular aperture therethrough communicating said inlet with the body interior, said body having a valve seat surrounding said aperture and having at least one opening communicating the body interior with the outlet; a cylindrical valve slidable in said body over a generally long stroke between an open position in which said opening is exposed to the body interior and a closed position in which said valve fully closes said aperture and only partially closes said opening, said opening having a configuration which gradually exposes a greater proportion thereof to the body interior upon movement of the valve to open position; biasing means urging said valve into closed position, said valve having a nose engageable with said valve seat to close said aperture, one end of said nose being conically shaped and extending through said aperture in the closed valve position to graually expose a greater proportion of said aperture to the body interior upon movement of said valve to open position and which is substantially elongated to provide a long stroke for said valve in fully exposing the aperture, the conical end of said nose providing a first surface subject to the system pressure when the valve is closed and is acted upon to provide initial valve movement in overcoming said biasing means, said valve having a generally flat surface adjacent the base of said nose and disposed normally to the movable path of the valve, said second surface forming a variable intermediate chamber with the valve body through which the system pressure must pass to reach the body opening, said second surface being substantially larger in area than said aperture in order to continue to provide an effective load to overcome said biasing means even though a pressure drop occurs locally about said first surface when the valve is moved from closed position by system pressure.

References Cited in the file of this patent

UNITED STATES PATENTS

| | | |
|---|---|---|
| 287,131 | Jarecki | Oct. 23, 1883 |
| 2,431,769 | Parker | Dec. 2, 1947 |
| 2,594,626 | Earle | Apr. 29, 1952 |
| 2,674,260 | Thrush | Apr. 6, 1954 |

FOREIGN PATENTS

| | | |
|---|---|---|
| 677,032 | Germany | June 17, 1939 |
| 1,004,561 | France | Nov. 28, 1951 |